AMPLIFIER FOR TRIVALENT PULSE SIGNALS THE PULSES OF WHICH OCCUR AT INSTANTS DETERMINED BY A CLOCK FREQUENCY, THE PEAK VALUES OF THE PULSES ONLY OCCURRING SEPARATELY

Filed Jan. 23, 1968 4 Sheets-Sheet 1

INVENTORS
LEO E. ZEGERS
JAN KUILMAN
BY
Frank R. Trifari
AGENT

INVENTORS
LEO E. ZEGERS
JAN KUILMAN
BY
Frank R. Trifari
AGENT

AMPLIFIER FOR TRIVALENT PULSE SIGNALS THE PULSES OF WHICH OCCUR AT INSTANTS DETERMINED BY A CLOCK FREQUENCY, THE PEAK VALUES OF THE PULSES ONLY OCCURRING SEPARATELY

Filed Jan. 23, 1968 4 Sheets-Sheet 3

INVENTORS
LEO E. ZEGERS
JAN KUILMAN
BY
Frank R. Trifari
AGENT

AMPLIFIER FOR TRIVALENT PULSE SIGNALS THE PULSES OF WHICH OCCUR AT INSTANTS DETERMINED BY A CLOCK FREQUENCY, THE PEAK VALUES OF THE PULSES ONLY OCCURRING SEPARATELY

Filed Jan. 23, 1968 4 Sheets-Sheet 4

INVENTORS
LEO E. ZEGERS
JAN KUILMAN
BY
Frank R. Trifari
AGENT

United States Patent Office 3,544,912

Patented Dec. 1, 1970

3,544,912

AMPLIFIER FOR TRIVALENT PULSE SIGNALS THE PULSES OF WHICH OCCUR AT INSTANTS DETERMINED BY A CLOCK FREQUENCY, THE PEAK VALUES OF THE PULSES ONLY OCCURRING SEPARATELY

Leo Eduard Zegers and Jan Kuilman, Emmasingel, Eindhoven, Netherlands, assignors, by mesne assignments, to U.S. Philips Corporation, New York, N.Y., a corporation of Delaware Filed Jan. 23, 1968, Ser. No. 699,893
Claims priority, application Netherlands, Jan. 24, 1967, 6701061
Int. Cl. H03k *5/08*
U.S. Cl. 328—164 8 Claims

ABSTRACT OF THE DISCLOSURE

In a system for regenerating clock frequency pulses from a trivalent pulse signal, the trivalent signal is differentiated and rectified to produce a pulse series of pulses having different amplitudes. Only the higher pulses are selected from the pulse series to regenerate clock pulses.

The invention relates to an amplifier for trivalent pulse signals the pulses of which occur at instants determined by a clock frequency, the peak values of the pulses only occurring separately, said amplifier being provided with an equalizing network to which a pulse regenerator is connected on the one hand and a clock-frequency extractor for recovering the clock frequency from the received pulse signals on the other hand, said clock-frequency extractor being formed by a rectifier succeeded by a threshold device and a selective circuit tuned to the clock-frequency, the output of said circuit being connected through a pulse shaper to an input of the pulse regenerator. Such amplifiers are advantageously used in practice as regenerative repeaters in transmission systems for the transmission of information by pulse code modulation, synchronous telegraphy, etc. with the aid of, for example, bipolar pulse signals composed of positive, zero and negative pulse elements, the positive and negative pulse elements only occurring alternately.

When using such amplifiers in transmission systems difficulties are experienced in practice as a result of the occurrence of the signal pulses at the receiver end at instants which show fluctuations ("jitter") relative to the instants marked by the clock-frequency at the transmitter end. Said fluctuations find their origin in all kinds of imperfections in the transmission system such as, for example, the presence of noise, changes in the composite parts, mutual interference of the signal pulses, amplitude-phase conversion, said imperfections having a disadvantageous influence on the true recovering of the clock frequency from the received pulse signals. Particularly in a transmission system of considerable length in which a large number of regenerative repeaters is incorporated, said fluctuations may assume high effective values which increase with the number of repeaters.

The object of the invention is to provide an amplifier of the type described in the preamble in which the influence of imperfections in the received pulse signals on the true recovering of the clock frequency is extremely mitigated in a simple manner.

The amplifier according to the invention is characterized in that a differentiating network for the received pulse signals is arranged in the clock-frequency extractor in cascade with the rectifier and the threshold device, said threshold device only passing the peaks of the differentiated pulse signals having the highest amplitude value to obtain the clock frequency in the selective circuit.

In order that the invention may be readily carried into effect it will now be described in detail, by way of example, with reference to the accompanying diagrammatic drawings, in which.

Figure 1:
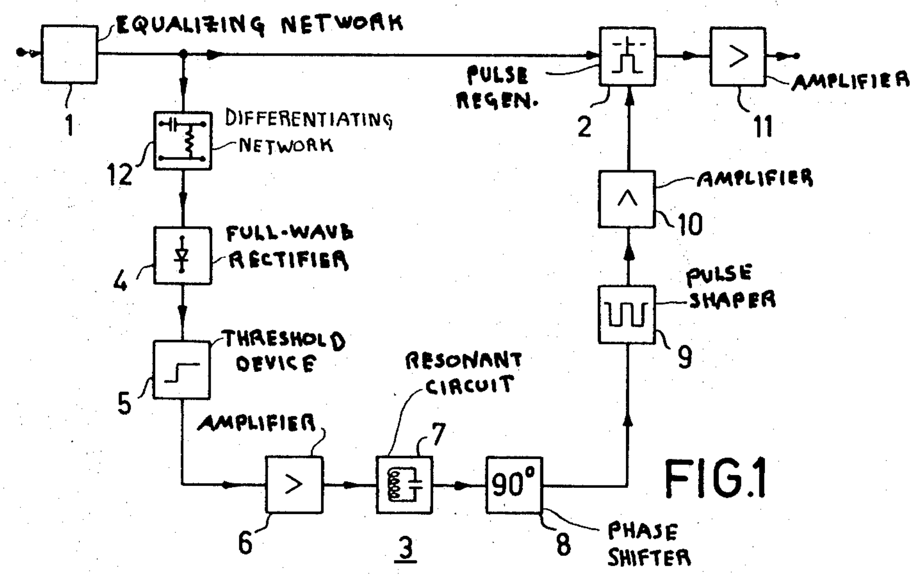
FIG. 1 shows an amplifier according to the invention, while for explanation of the amplifier of FIG. 1 a few time diagrams are shown in FIGS. *2a–2g* and FIGS. *3a–3f*.
Figure 2A:
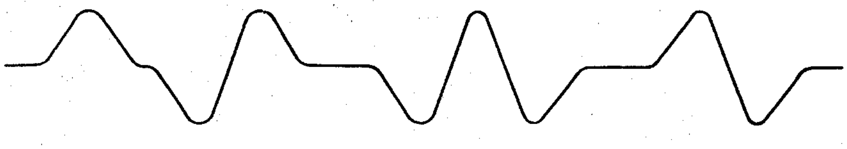
Figure 2B:
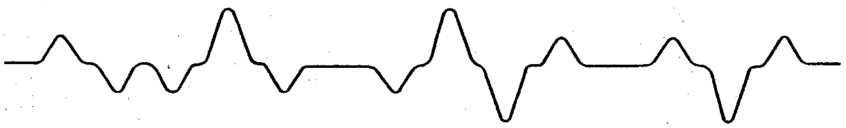
Figure 2C:
Figure 2D:
Figure 2E:
Figure 2F:
Figure 2G:
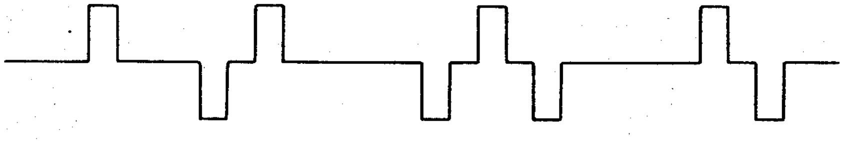
Figure 3A:
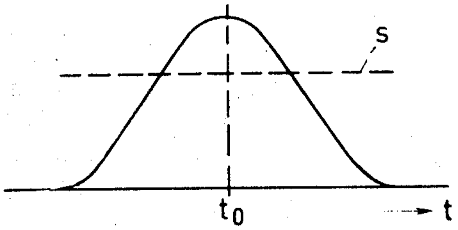
Figure 3B:
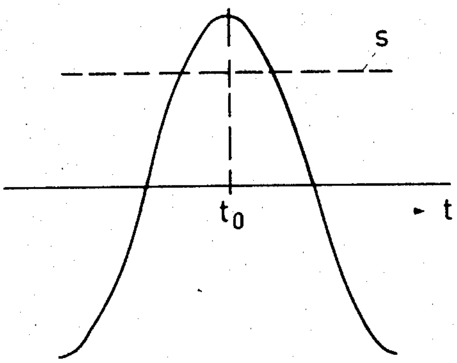
Figures 3E, 3F:
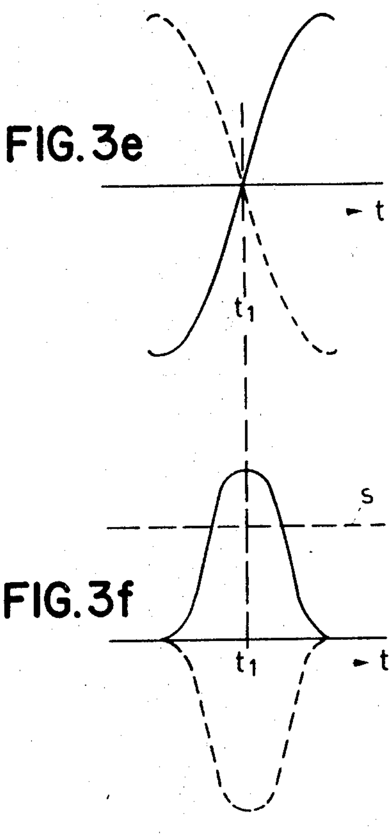
Figure 3C:
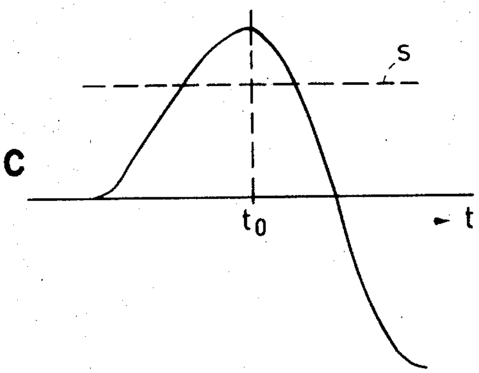
Figure 3D:
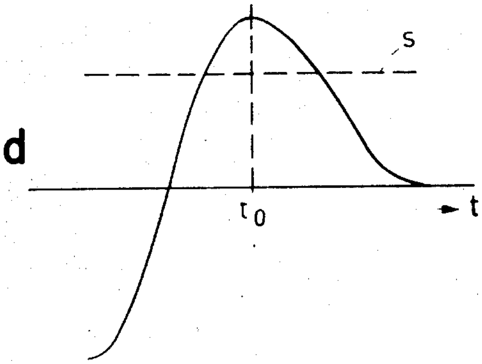

FIG. 1 shows an amplifier according to the invention which, for example, is arranged as a regenerative repeater in a transmission cable for the transmission of bipolar pulse signals consisting of positive, zero and negative pulse elements which occur at instants marked by a clock-frequency, the positive and negative pulse elements only occurring alternately. The amplifier comprises an equalizing network 1 to equalize the amplitude and phase characteristics of the cable section preceding the input, a pulse regenerator 2 being connected to the output of the equalizing network 1 to regenerate the signal pulses according to shape and instant of occurrence, as well as a clock-frequency extractor 3 for recovering the clock-frequency from the received pulse signals.

The clock-frequency extractor 3 is provided with a full-wave rectifier 4 to which a threshold device 5 is connected which passes the peaks of the rectified signal pulses, which peaks, after amplification in an amplifier 6, excite a selective circuit 7 in the form of a resonance circuit tuned to the clock frequency, the output voltage of said circuit being applied to a pulse source 9 through a 90° phase-shifting network 8, equidistant pulses of clock-frequency occurring at the output of the pulse shaper 9 which clock pulses are applied to an input of the pulse regenerator 2 after amplification in an amplifier 10.

In the embodiment described the pulse regenerator 2 is of a balanced construction having two identical gates, one gate being opened only during simultaneous occurrence of a clock pulse and a positive signal pulse element and passing said clock pulse with positive polarity to the output, while conversely the other gate is opened only during simultaneous occurrence of a clock pulse and a negative signal pulse element and passes said clock pulse with negative polarity to the output. In this manner signal pulses regenerated according to shape and instant of occurrence and corresponding to the received signal pulses are obtained at the output of the pulse regenerator 2. After amplification in an output amplifier 11 the regenerated pulse signals are supplied to a cable section succeeding the output.

In spite of this pulse regeneration according to instant of occurrence, the signal pulses at the output of the pulse regenerator 2 appear to occur at instants which fluctuate about the instants marked by the clock frequency.

The invention produces a considerable reduction of the effective value of these time-marking fluctuations because a differentiating network 12 for the received pulse signals is arranged in the clock-frequency extractor 3 in cascade with the rectifier 4 and the threshold device 5, said threshold device 5 only passing the peaks of the differentiated pulse signals having the highest amplitude value for excitation of the resonance circuit. The differentiating network 12 has, for example, a time constant 0.2T, where T is the period of the clock frequency.

The clock-frequency extraction and the pulse regeneration in the amplifier according to the invention will now be considered with reference to the time diagrams of FIG. 2.

If, for example, the bipolar pulse series *a* appears at the input of the differentiating network 12 under the influence of the transmission characteristics of the cable section preceding the amplifier and the equalizing network 1, then the derived pulse series *b* appears at the output of the differentiating network 12 due to differentiation of the bipolar pulse series *a*, the peaks of the pulse series *b* having the highest amplitude values coinciding with those zero-crossings in the bipolar pulse series *a* which are associated with direct transitions between pulse elements of opposite polarity. By full-wave rectification of the pulse series *b* in the rectifier 4 the pulse series *c* is obtained which is supplied to the threshold device 5 the threshold value of which is only exceeded by the peaks having the highest amplitude value in the pulse series *c* so that the pulse series *d* is produced at the output of the threshold device 5. Said pulse series *d* in which all pulses coincide with the zero-crossings at direct transitions between pulse elements of opposite polarity in the pulse series *a* is now utilized after amplification in the amplifier 6 for excitation of the resonance circuit 7 of which the output voltage *e* of clock frequency is applied to the pulse shaper 9 through the 90° phase-shifting network 8. The series of clock pulses *f* is then formed in the pulse shaper 9, which series, like the original bipolar pulse series *a*, is supplied to the pulse regenerator 2, the bipolar pulse series *g* regenerated according to shape and instant of occurrence being produced at the output of the pulse regenerator 2 in the manner as described hereinbefore, the positive and negative pulse elements of said series being formed by pulses having a width of $T/2$, where T is equal to the period of the clock-frequency.

Exclusively and solely with trivalent pulse signals in which the peaks of the pulses only occur seperately, a considerable reduction of the effective value of the time-marking fluctuations is obtained in this manner, for example, by 4 db as will now be described with references to the time diagrams shown in FIG. 3.

If, for example, the starting point is a random bipolar pulse series which has undergone an ideal phase and amplitude equalization and if the clock frequency is recovered in known manner by supplying the peaks of the rectified signal pulses separated with the aid of a threshold device to the resonance circuit 7 tuned to the clock frequency, then it is found that the resonance circuit 7 is excited by peaks having mutually different shapes which depend on the succession in which the various pulse elements occur in the bipolar pulse series. FIG. 3 shows particularly in what manner a positive pulse element may occur, the pulse elements succeeding one another in the various cases as follows: zero-positive-zero (*a* in FIG. 3) negative-positive-negative (*b* in FIG. 3) zero-positive-negative (*c* in FIG. 3) and negative-positive-zero (*d* in FIG. 3). The instant of occurrence determined by the clock-frequency is indicated in FIG. 3 by $t_0$ for the positive pulse elements and the threshold value for separating the peaks is indicated by the broken lines.

As FIG. 3 illustrates the resonance circuit 7 is excited by separated peaks of four different shapes, namely in the cases *a* and *b* by peaks of symmetrical shape relative to the instant $t_0$ but of mutually different duration and in the cases *c* and *d* by peaks of asymmetrical shape relative to the instant $t_o$, especially the peaks of the type shown in *c* and *d* causing phase variations of the clock-frequency circuit voltage and thus also of the clock pulses generated by the pulse shaper 9 which become apparent during pulse regeneration as time-marking fluctuations in the transmitted signal pulses of the pulse regenerator 2. It is thus found that even after an ideal equalization of the signal pulses time-marking fluctuations occur in the regenerated signal pulses which find their principal origin in the kind of pulse element which precedes or succeeds the separated peak corresponding to a regenerated signal pulse and particularly in that, as the case may be, the pulse element preceding or succeeding the peak is a zero pulse element or a pulse element of a polarity opposite to that of the peak.

By using the steps according to the invention these time-marking fluctuations, which even occur after an ideal equalization, are obviated in an elegant manner in trivalent pulse signals in which the peaks of the pulses only occur separately. In fact, by differentation of the received pulse series (compare *a* in FIG. 2) in the differentiating network 12, a derived pulse series is produced (compare *b* in FIG. 2) of which the peaks having the highest amplitude value only occur at direct transitions between pulse elements of opposite polarity in the original pulse series, while with peaks in the original pulse series actually a zero pulse element occurs in this derived pulse series. For illustration FIG. 3 shows at *e* the direct transitions from a positive to a negative pulse element and from a negative to a positive pulse element in the original pulse series, said transitions, which are equal as regards shape, showing radial symmetry relative to the instant $t_1$ of zero-crossing, while FIG. 3 shows at *f* the pulses obtained by differentiation of these transitions, which mutually equal pulses are in addition symmetrical relative to the instant $t_1$.

As has been described in the foregoing the resonance circuit 7 is only excited by these uniform peaks of the highest amplitude value in the derived pulse series in which, as is apparent from *b* in FIG. 2 and *f* in FIG. 3, pulse element preceding or succeeding the peak is always formed by a zero pulse element with the result that the time-marking fluctuations in the regenerated signal pulses caused by differences in kind of the pulse element preceding or succeeding the peak (compare *a*–*d* in FIG. 3) are avoided in a very simple manner.

Time-marking fluctuations in the regenerated signal pulses are not only avoided in an ideal equalization by the steps according to the invention, but it has also been found in a practical equalization that the time-marking fluctuations caused by the imperfections of the practical equalization, for example, as a result of transient phenomena are largely reduced.

Particularly advantageous results are realized by using an equalization of the type in which mutual interference of the signal pulses at the instants marked by clock frequency are reduced to substantially zero ("minimum intersymbol-interference equalization"). In fact, under the influence of such a transmission characteristic the pulse signals assume the correct amplitude value at the instants marked by the clock frequency with the result that in case of direct transitions between pulse elements of opposite polarity the zero-crossings and hence also the symmetrical peaks relative to said zero-crossings for the excitation of the resonance circuit do not show substantially any fluctuation in their instants of occurrence so that the regenerated signal pulses are also substantially free from time-marking fluctuations.

Figure 4:
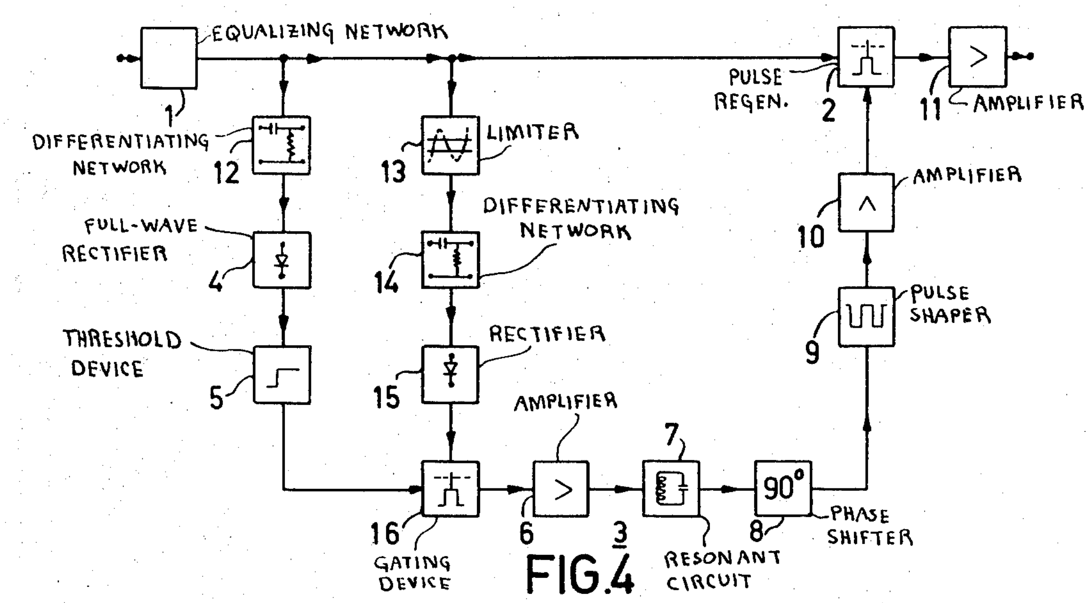
FIG. 4 shows a further embodiment of the amplifier of FIG. 1 and FIGS. *5a–5i* show the time diagrams associated therewith.

A further reduction of the time-marking fluctuations in the regenerated signal pulses is obtained when using the amplifier shown in FIG. 4 in which elements corresponding to those of FIG. 1 are indicated by the same reference numerals.

In the amplifier of FIG. 4 a limiter 13 is also connected to the input of the clock-frequency extractor 3, which limiter is succeeded by a differentiating network 14 for the limited pulse signals, and a rectifier 15 which is connected to a gating device 16 to which also the peaks separated by the threshold device 5 are applied as gate pulses while the output of the gating device 16 is connected to the resonance circuit 7. The time constant of the differentiating network 14 is, for example, 0.1T, where T is the period of the clock frequency.

Figures 5A, 5B, 5C, 5D, 5E, 5F, 5G, 5H, 5I:
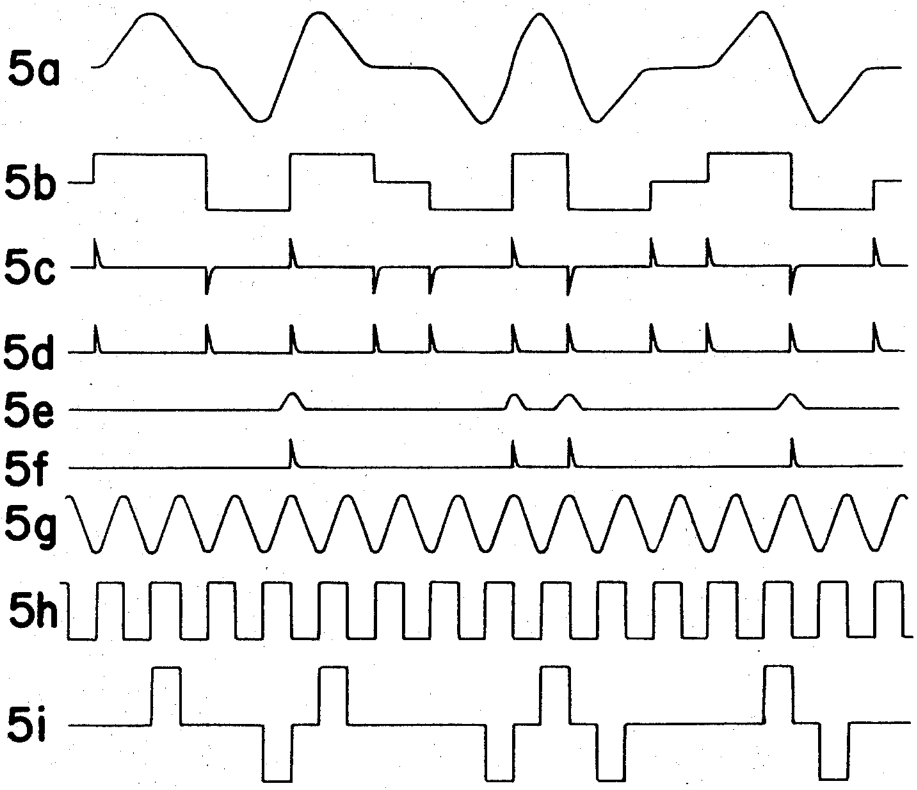

The operation of the amplifier of FIG. 4 will now further be explained with reference to the time diagrams of FIG. 5.

If, for example, the bipolar pulse series *a* (compare *a* in FIG. 2) appears at the output of the equalizing network 1, the pulse series *b* is produced by the two-sided limiting of said bipolar pulse series *a* in the limiter 13. By differentiation of the limited pulse series *b* in the differentiating network 14 the pulse series *c* is obtained which is composed of sharp needle pulses which coincide with the transitions between the pulse elements in the original pulse series *a* and after full-wave rectification of the pulse series *c* in the rectifier 15 the pulse series *d* occurs at the input of the gating device 16. The pulses of the pulse series *e* are also supplied as gate pulses to the gating device 16 which pulses are formed by the peaks separated with the aid of the threshold device 5 which peaks are derived from the original pulse series *a* in the manner as described in FIG. 1 (compare *d* in FIG. 2). Only the needle pulses of the pulse series *d* coinciding with the pulse series *e* are passed by the gating device 16 so that the pulse series *f* is produced at the output of the gating device 16 the needle pulses of which series all coincide with the zero-crossing at direct transitions between pulse elements of opposite polarity in the original pulse series *a*. After amplification in the amplifier 6 said pulse series *f* is applied for excitation to the resonance circuit 7.

While thus in the amplifier of FIG. 1 the resonance circuit 7 is excited by the pulse series *e*, the needle pulses of the pulse series *f* are utilized to that end in the amplifier of FIG. 4 which needle pulses are much less sensitive to shape-variatons by, for example, occurring noise. As a result an influence of the resonance circuit output voltage *g* by the shape of the pulses in the original pulse series *a* is obviated to a large extent which in practice results in a reduction of the effective value of the time-marking fluctuations in the regenerated signal pulses by, for example, 7 db. For completeness' sake the series of clock-pulses *h* formed in the pulse shaper 9 as well as the regenerated bipolar pulse series *i* at the output of the amplifier of FIG. 4 are shown in FIG. 5.

Figure 6:
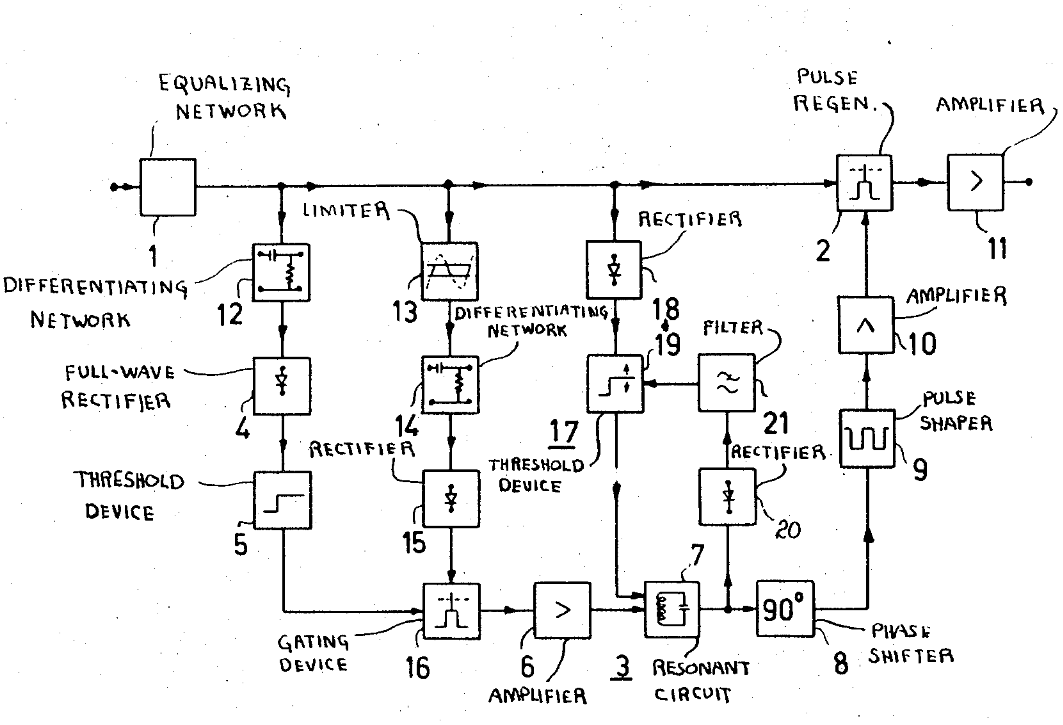
FIG. 6 shows a particularly advantageous embodiment of the amplifier according to the invention.

It has been found from further extensive investigations that optimum results in the true recovering of the clock-frequency are achieved if the amplifier shown in FIG. 6 is used. Elements corresponding to those in FIG. 4 are indicated by the same reference numerals in FIG. 6. The excitation of the resonance circuit 7 with sharp needle pulses shown in FIG. 4 is not only used for the amplifier of FIG. 6 but also according to the further invention a separate extraction circuit 17 is arranged between the input of the clock-frequency extractor 3 and the resonance circuit 7, said extraction circuit 17 being provided with a rectifier 18 and a succeeding threshold device 19 which passes the peaks of the rectified signal pulses for a small fraction only. In addition a rectifier 20 is connected to the output of the resonance circuit 7 succeeded by a smoothing filter 21, the output voltage of which adjusts the threshold value of the threshold device 19. The smoothing filter 21 has a cut-off frequency, of for example, 1/(10T).

It has been found in the investigations that the generated resonance circuit voltage shows amplitude variations with the result that especially at low values of the circuit voltage phase variations of the clock pulses are caused, among other things, as a result of imperfections in the adjustment of the pulse shaper 9. Said amplitude variations in the resonance circuit voltage are to be ascribed to the fact that in a random bipolar pulse series the direct transitions between the pulse elements of opposite polarity occur in accordance with entirely random distribution and in addition occur less often than the peaks in the bipolar pulse series, namely at approximately half the probability of the peaks.

By using the steps described in FIG. 6, it is now achieved that the resonance circuit voltage is considerably less liable to amplitude variations and particularly always has a sufficiently high value for generating the clock pulses with reliable phase.

If, for example, the number of direct transitions between pulse elements of opposite polarity in the bipolar pulse series decreases and hence the number of excitation pulses for the resonance circuit 7, the resonance circuit voltage decreases as a result thereof. Consequently, also the output voltage of the smoothing filter 21 decreases, which decrease will then cause a reduction of the threshold value of the threshold device 19. The signal peaks in the bipolar pulse series are then supplied for a small fraction, for example, maximum 20, for excitation in the correct phase, to the resonance circuit 7 through the threshold device 19 so that the resonance circuit voltage increases and the original decrease of the resonance circuit voltage is counteracted. Conversely, with an increase of the resonance circuit voltage the increase of the threshold value attended therewith will oppose a further excitation of the resonance circuit 7 by the signal peaks in the bipolar pulse series. In this manner a resonance circuit voltage is available in the amplifier of FIG. 6 the amplitude of which does not decrease below a certain minimum value which is determined by the control circuit: resonance circuit 7, rectifier 20, smoothing filter 21, threshold device 19, resonance circuit 7.

An optimum reduction of the effective value of the time-marking fluctuations, for example, by 9 db, is not only achieved with all steps combined, but also a particularly quick adjustment of the time marking is obtained after interruptions in the supply of the signal pulses to the amplifier since in fact the threshold device 19 has only a minimum threshold value during interruptions so that exactly then the resonance circuit 7 is excited to the strongest extent due to the two-fold manner of excitation.

It may be noted in this respect that instead of by a resonance circuit the selective circuit 7 may alternatively be formed by an automatic phase correction circuit (AFC circuit) provided with a local oscillator from which the clock frequency is derived and which is stabilized in its phase by means of a phase discriminator as a function of the peaks of the differentiated pulse signals separated by the threshold device 5.

What is claimed is:

1. An amplifier for trivalent pulse signals the pulses of which occur at instants determined by a clock frequency, the peak values of the pulses only occurring separately, said amplifier being provided with an equalizing network to which a pulse regenerator is connected on the one hand and a clock-frequency extractor for recovering the clock frequency from the received pulse signals on the other hand, said clock-frequency extractor being formed by a rectifier succeeded by a threshold device and a selective circuit tuned to the clock frequency, the output of said circuit being connected through a pulse shaper to an input of the pulse regenerator, characterized in that a differentiating network for the received pulse signals is arranged in the clock-frequency extractor in cascade with the rectifier and the threshold device, said threshold device only passing the peaks of the differentiated pulse signals having the highest amplitude value to obtain the clock frequency in the selective circuit.

2. An amplifier as claimed claim 1, characterized in that the time constant of the differentiating network is approximately one fifth of the period of the clock frequency.

3. An amplifier as in claim 1, characterized in that the selective circuit is formed by an automatic phase correction circuit (AFC-circuit) provided with a local oscillator from which the clock frequency is derived, said local oscillator being stabilized in its phase by means of a phase discriminator as a function of the peaks of the differentiated pulse signals separated by the threshold device.

4. An amplifier as in claim 1 characterized in that a separate extraction circuit is arranged between the input of the clock-frequency extractor and the selective circuit, said extraction circuit being provided with a rectifier and a succeeding threshold device which only passes the peaks of the rectified pulse signals for a small fraction.

5. An amplifier as claimed in claim 4, characterized in that a rectifier including a succeeding smoothing filter is connected to the output of the selective circuit, the output voltage of the smoothing filter adjusting the threshold value of the threshold device in the separate excitation circuit.

6. An amplifier as claimed in claim 1 characterized in that also a limiter is connected to the input of the clock-frequency extractor which limiter is succeeded by a differentiating network for the limited pulse signals and a rectifier which is connected to a gating device to which also the peaks separated by the threshold device are applied as gate pulses, the output of the gating device being connected to the selective circuit.

7. An amplifier as claimed in claim 6, characterized in that the time constant of the differentiating network for the limited pulse signals is approximately one-tenth of the period of the clock frequency.

8. A system for deriving clock pulses from trivalent pulse signals of the type in which pulses occur only at instants determined by a clock frequency, wherein said pulse signals have maximum and minimum peak levels and an intermediate level, and wherein transitions of said signal include first transitions between said intermediate level and either of said peak levels, and second transitions between said peak levels which pass said intermediate level only instantaneously, said system comprising a source of said signals, differentiating circuit means coupled to said source for producing a pulse series of pulses having first peak levels corresponding to said first transitions and second higher peak levels corresponding to said second transitions, threshold circuit means for selecting only said pulses of said second higher peak level from said pulse series, and means for synchronizing a clock signal with said selected pulses.

References Cited

UNITED STATES PATENTS

| | | | |
|---|---|---|---|
| 2,856,525 | 10/1958 | Lubkin | 328—164 |
| 3,071,733 | 1/1963 | Holzer et al. | 328—164 |
| 3,252,098 | 5/1966 | Schlaepfer | 307—268 |
| 3,261,986 | 7/1966 | Kawashima et al. | 328—164 |
| 3,461,390 | 8/1969 | Mack | 307—268 |

DONALD D. FORRER, Primary Examiner

H. A. DIXON, Assistant Examiner

U.S. Cl. X.R.

307—269